United States Patent Office 2,924,773
Patented Feb. 9, 1960

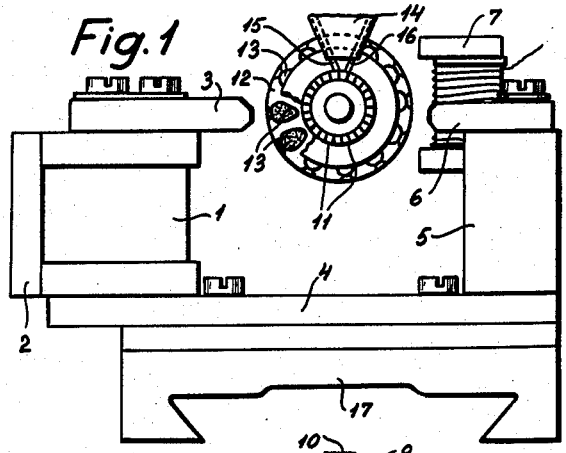
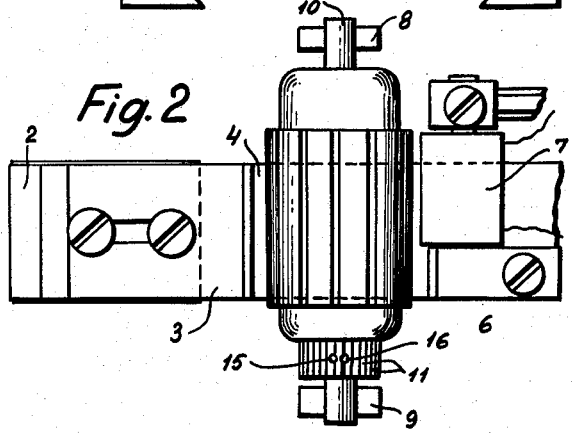
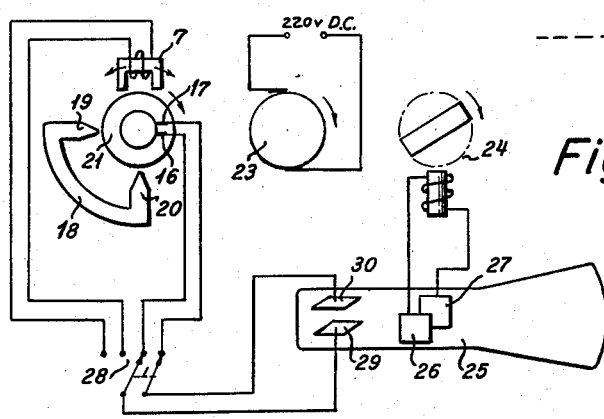
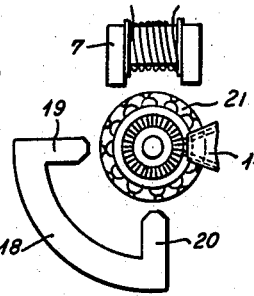
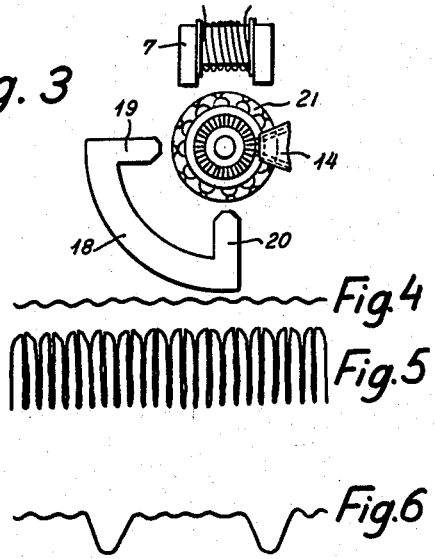
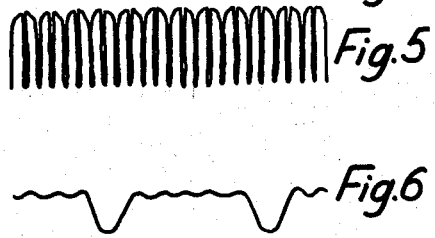
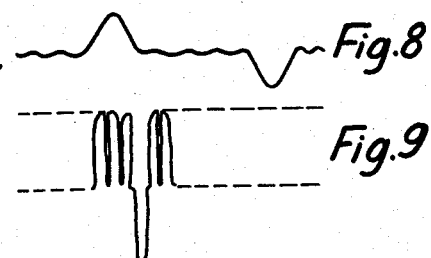
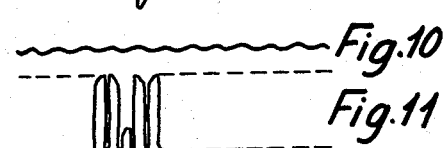

2,924,773
APPARATUS FOR TESTING ELECTRIC ARMATURES

Gravs Lykke, Copenhagen, Denmark

Application August 23, 1954, Serial No. 451,388

16 Claims. (Cl. 324—51)

This invention relates to an apparatus for testing electric armatures, especially D.C. armatures of fractional horse power motors.

It is an object of the invention to provide an apparatus which will indicate very distinctly short circuiting of one or more turns of an armature coil.

Another object is to provide an apparatus, in which magnetic remanence in the armature will not influence substantially the indication.

It is a further object to provide an apparatus, in which coil slots or grooves of an armature will not influence substantially the indication.

These and further objects will be evident from the following description taken in conjunction with the accompanying drawing, in which I have shown two embodiments of my invention.

In the drawing:

Fig. 1 shows diagrammatically a portion of an apparatus according to the invention, seen from one end, Fig. 2 the same portion of the apparatus, seen in plan view, Fig. 3 shows a portion of an apparatus of another embodiment, seen from one end, the apparatus accommodating an electric armature in these three figures, Figures 4-11 show oscilloscope views procured by means of an apparatus according to the invention.

Fig. 12 shows a diagrammatical view of an apparatus of the embodiment shown in Fig. 3 including motor for rotating the armature to be tested and means for obtaining a sweep voltage as well as an indicating means.

In Figs. 1 and 2 the numeral 1 designates a permanent magnet provided with an armature 2. A pole piece 3 is connected to one pole of the magnet and is formed with a narrow edge. The other pole of the magnet is magnetically connected through a thick plate 4 and a block 5 to another pole piece 6 likewise formed with a narrow pole edge. The two pole piece edges are opposing each other. Beside pole piece 6 is disposed an electromagnet 7 comprising a measuring coil and a core extending through said coil. The said electromagnet is arranged to have its mid-point directly opposite pole piece 3 and to have the one core end above a horizontal plane through pole piece 3 and the other core end below said plane. The core is preferably U-shaped having its ends facing the pole piece 3.

The apparatus comprises bearing members 8 and 9 for a shaft 10 of a D.C. armature provided at one end with a commutator with segments 11. The armature comprises tooth portions 12 with slots or grooves 13 therebetween for armature coils. The armature furthermore comprises a carrier 14 for two contact members 15 and 16 arranged slightly spaced to contact two adjacent segments of the commutator. Plate 4 is attached to a sliding member 17 arranged slidably on a base, not shown.

The apparatus comprises an indicating device, preferably a cathode ray oscilloscope, not shown, and a mechanism for lifting contact members 15 and 16 from the commutator and disconnecting them from the indicating device and connecting the ends of coil of electromagnet 7 to said indicating device, and to lower said contact members 15 and 16 to contact the commutator and to connect them to the indicating device and to disconnect measuring coil of electromagnet 7 from the indicating device. Furthermore the apparatus comprises a synchronous motor and coupling means connected to the latter and adapted to be disengageably connected to shaft 10. An A.C. generator is coupled to the shaft of said synchronous-motor and is connected to the oscilloscope to influence the means thereof for providing a periodic sweep of the beam to synchronise the sweep with the rotation of shaft 10. The stator of said synchronous-motor is arranged turnable and is provided with a dial.

When using the apparatus the contact members 15 and 16 may for instance first be lifted out of contact with the segments of the armature commutator, and coil of electromagnet 7 is connected to the oscilloscope in a manner obvious to those skilled in the art. By rotating the armature in the narrow magnetic field provided by magnet 1 and extending from pole piece 3 to pole piece 6 through armature the tooth portion 12 will cause variations of the magnetic field. Hereby is induced voltage in electromagnet 7, indicated on the oscilloscope screen as shown in Fig. 4. If one or more turns of an armature coil is/are shorted, two voltage impulses are caused during each revolution, indicated on oscilloscope screen as shown in Fig. 6. If an armature coil is disposed reversed, two oppositely directed impulses are caused, indicated on screen as shown in Fig. 8.

When electromagnet 7 is disconnected from th oscilloscope, and contact members 15 and 16 are lowered to contact segments of the commutator and are connected to the oscilloscope, then is obtained an indication as shown in Fig. 5 if the armature is without faults. The carrier 14 may be adjustably disposed and is placed so that the voltage is derived at or near the angular position of an armature coil, in which position the voltage induced in said armature coil is maximum. Short circuiting of one or more turns of an armature coil is indicated as shown in Fig. 7. Reversed disposition of a coil is indicated as shown in Fig. 9.

Open circuit due to broken conductor may be indicated by disposing an electric connection between contact members 15 and 16, the connection preferably having a resistance substantially equalling the armature resistance. Hereby is obtained indication as shown in Figs. 10 and 11.

The apparatus can furthermore be used to indicate other faults in armatures, as will be obvious to those skilled in the art. By turning the stator of the A.C. generator the loops on the oscilloscope screen will be displaced. Hereby the operator can displace a selected loop indicating a fault to a mark on the oscilloscope screen. Upon stopping the rotation it is, then, easy to find the corresponding armature coil.

The apparatus described can be used for testing A.C. armatures. The apparatus can be modified so that it can be used for testing armatures for motors having four or more field poles. One pole piece, either pole piece 3 or pole piece 6, is sufficient.

In Fig. 3 the numeral 18 indicates a permanent magnet having two poles 19 and 20 spaced 90° in relation to the armature 21. Electromagnet 22 is disposed opposite pole 20 and is arranged adjustably for some degrees in relation to the armature. This embodiment is advantageous in testing armatures of varying angular distance from coil to commutator segment.

In Fig. 12 is diagrammatically illustrated a complete apparatus comprising magnet 18 with poles 19, 20, electromagnet 7, contact members 16, 17, an A.C. generator 24, a cathode ray oscilloscope 25 serving as an indicating means and provided with plates 26 and 27 connected to said A.C. generator to provide a periodic sweep on the oscilloscope screen, and switch means 28 to connect alternately the coil of electromagnet 7 and the contact members 16, 17 to the other plates 29 and 30 of the oscilloscope. Motor 23 rotates armature 21 and the rotor of the A.C. generator 24.

The apparatus may be adapted to be driven manually, and the indicating device may be an ordinary voltage meter so as to provide an inexpensive apparatus.

I claim:

1. An apparatus for testing electric armatures, comprising in combination bearing means for rotatably accommodating an electric armature to be tested in a manner to permit of easy placing said armature in said bearing means and removing it therefrom, rotation means having constant speed of rotation for rotating said armature, a magnet of substantially constant strength character having at least one pole near the periphery of the armature, a pickup coil disposed near the periphery of the armature with its axis transverse to the axis of the armature and with a portion of the coil on each side of the said pole of the magnet, and an electric indicating device connected to said pickup coil to indicate the voltage induced therein during rotation of said armature.

2. An apparatus for testing electric armatures, comprising in combination bearing means for rotatably accommodating an electric armature, means for rotating said armature at constant speed of rotation, a magnet of substantially constant strength character having at least one pole near the periphery of the armature, a pickup coil disposed near the periphery of the armature so as to have its end on a straight line transverse to the axis of the armature and at either side of the plane defined by said pole of the magnet and the armature axis, and an electric indicating device connected to said pickup coil to indicate the voltage induced therein during rotation of said armature.

3. An apparatus for testing electric armatures, comprising in combination bearing means for rotatably accommodating an electric armature to be tested, rotation means having constant speed of rotation for rotating said armature, a magnet of substantially constant strength character having at least one pole near the periphery of the armature, a pickup coil disposed near the periphery of the armature at an angular distance from the said pole of the magnet substantially equal to the angular distance between two coil sides of the armature winding and having its ends on a straight line transverse to the armature axis, and an electric indicating device connected to said pickup coil to indicate the voltage induced therein during rotation of said armature.

4. An apparatus for testing electric armatures, comprising in combination bearing means for rotatably accommodating an electric armature to be tested, rotation means having constant speed of rotation for rotating said armature, a magnet of substantially constant strength character having at least one pole near the periphery of the armature, a pickup coil with an iron core disposed near the periphery of the armature, the said iron core having its end on a straight line transverse to the axis of the armature and at either side of said pole of the magnet, and an electric indicating device connected to said pickup coil to indicate the voltage induced therein during rotation of said armature.

5. An apparatus for testing electric armatures, comprising in combination bearing means for rotatably accommodating an electric armature to be tested, rotation means of constant speed of rotation for rotating said armature, a magnet of substantially constant strength character having at least one pole near the periphery of the armature, a pickup coil with an iron core disposed near the periphery of the armature at an angular distance from said pole of the magnet substantially equal to the angular distance between two coil sides of the armature winding, the said iron core having its ends on a straight line transverse to the armature axis, and an electric indicating device connected to said pickup coil to indicate the voltage induced therein during rotation of said armature.

6. An apparatus for testing electric armatures, comprising in combination bearing means for rotatably accommodating an electric armature to be tested, rotation means having constant speed of rotation for rotating said armature, a magnet of substantially constant strength character having at least one pole near the periphery of the armature, a pickup coil with an iron core of U-shape disposed near the periphery of the armature at an angular distance from said pole of the magnet substantially equal to the angular distance between two coil sides of the armature winding, the said iron core having its legs ends facing the armature and situated on a straight line transverse to the armature axis, and an electric indicating device connected to the said pickup coil to indicate the voltage induced therein during rotation of said armature.

7. An apparatus as claimed in claim 6, in which the pickup coil is symmetrically arranged on the iron core.

8. An apparatus for testing electric armatures, comprising in combination bearing means for rotatably accommodating an electric armature to be tested, rotation means having constant speed of rotation for rotating said armature, a magnet of substantially permanent character having at least one pole near the periphery of the armature, a pickup coil with an iron core of U-shape disposed near the periphery of the armature, the iron core having its legs facing the armature and one leg at either side of the said pole of the magnet, and an electric indicating device connected to said pickup coil to indicate the voltage induced therein during rotation of said armature.

9. An apparatus as claimed in claim 8, in which the pickup coil is symmetrically arranged on the iron core.

10. An apparatus for testing electric armatures, comprising in combination means for rotating an armature to be tested on its axis, a permanent magnet having at least one pole near the periphery of the armature, a pickup coil member having its active ends disposed near the periphery of the armature at either side of the said pole of the magnet, and an electric indicating device connected to the coil of said pickup coil member to indicate the voltage induced therein during rotation of said armature.

11. An apparatus for testing electric armatures, comprising in combination means for rotating an armature to be tested on its axis, a permanent magnet having at least one pole near the periphery of the armature, a pickup coil member having its active ends disposed near the periphery of the armature at an angular distance from said pole of the magnet substantially equal to the angular distance between the two sides of a coil in the armature winding, and an electric indicating device connected to the coil of said pickup coil member to indicate the voltage induced therein during rotation of said armature.

12. An apparatus as claimed in claim 11, comprising furthermore two contact members for contacting simultaneously two segments of the commuter of the armature, the said contact members being connected to an indicating device for indicating the voltage induced in the coils of the armature during the rotation.

13. An apparatus as claimed in claim 11, comprising furthermore two contact members for contacting simultaneously two segments of the commuter of the armature to be tested, and switch means for alternatively connecting the pickup coil ends and the contact members to said indicating device.

14. An apparatus for testing electric armatures, comprising in combination means for rotating an armature to be tested on its axis, and with constant speed of rotation, a magnet of substantially constant strength character having at least one pole near the periphery of the armature, a pickup coil member having its active ends disposed near the periphery of the armature at an angular distance from the said pole of the magnet substantially equal to the distance between the two sides of a coil in the armature winding and angularly offset in relation to each other, and an electric indicating device connected to the coil of said pickup coil member to indicate the voltage induced therein during rotation of the armature.

15. An apparatus as claimed in claim 14, in which the electric indicating device is a cathode ray oscilloscope having one set of deflection plates connected to the pickup coil.

16. An apparatus as claimed in claim 14, in which the pickup coil member is arranged angularly adjustable in relation to said pole of the magnet.

References Cited in the file of this patent

UNITED STATES PATENTS

| | | |
|---|---|---|
| 556,646 | Scott et al. | Mar. 17, 1896 |
| 2,427,672 | Haydock | Sept. 23, 1947 |
| 2,683,860 | Reid | July 13, 1954 |

FOREIGN PATENTS

| | | |
|---|---|---|
| 560,124 | Great Britain | Mar. 21, 1944 |
| 618,050 | Great Britain | Feb. 16, 1949 |